US012655281B2

(12) United States Patent
Ahn et al.

(10) Patent No.: US 12,655,281 B2
(45) Date of Patent: Jun. 16, 2026

(54) COMPOSITE RESIN COMPOSITION AND MOLDED PRODUCT FOR A VEHICLE INTERIOR USING THE SAME

(71) Applicants: HYUNDAI MOTOR COMPANY, Seoul (KR); KIA CORPORATION, Seoul (KR); HDC HYUNDAI ENGINEERING PLASTICS CO., LTD., Dangjin-si (KR)

(72) Inventors: Jin Gi Ahn, Seoul (KR); Eun Seob Shin, Yongin-si (KR); Jun Hyeong Ban, Yongin-si (KR); Chang Hee Kang, Yongin-si (KR)

(73) Assignees: HYUNDAI MOTOR COMPANY, Seoul (KR); KIA CORPORATION, Seoul (KR); HDC HYUNDAI ENGINEERING PLASTICS CO., LTD., Dangjin-si (KR)

( * ) Notice: Subject to any disclaimer, the term of this patent is extended or adjusted under 35 U.S.C. 154(b) by 527 days.

(21) Appl. No.: 18/143,114

(22) Filed: May 4, 2023

(65) Prior Publication Data

US 2024/0158621 A1 May 16, 2024

(30) Foreign Application Priority Data

Nov. 11, 2022 (KR) ........................ 10-2022-0150405

(51) Int. Cl.
*C08L 23/12* (2006.01)
*C08K 3/013* (2018.01)
*C08K 7/00* (2006.01)

(52) U.S. Cl.
CPC .............. *C08L 23/12* (2013.01); *C08K 3/013* (2018.01); *C08K 7/00* (2013.01); *C08L 2203/20* (2013.01); *C08L 2205/025* (2013.01)

(58) Field of Classification Search
CPC .. C08K 3/013; C08K 3/34; C08K 7/00; C08L 2203/20; C08L 2205/025; C08L 23/06; C08L 23/0815; C08L 23/12; C08L 23/16
See application file for complete search history.

(56) References Cited

U.S. PATENT DOCUMENTS

| | | | |
|---|---|---|---|
| 6,017,989 A | 1/2000 | Malm et al. | |
| 7,629,417 B2 | 12/2009 | Winowiecki et al. | |
| 9,139,725 B2 | 9/2015 | Noh et al. | |
| 2014/0135440 A1 | 5/2014 | Noh et al. | |
| 2022/0411593 A1 | 12/2022 | Yerigeri | |

FOREIGN PATENT DOCUMENTS

| | | | | | |
|---|---|---|---|---|---|
| CN | 103910937 A | * | 7/2014 | ............ | B29C 48/92 |
| CN | 106751352 A | | 5/2017 | | |
| JP | H08239527 A | | 9/1996 | | |
| JP | H10330623 A | | 12/1998 | | |
| JP | 2014015501 A | | 1/2014 | | |
| KR | 20140060129 A | | 5/2014 | | |
| KR | 20150067026 A | | 6/2015 | | |
| KR | 20150067472 A | | 6/2015 | | |
| WO | 2021108612 A1 | | 6/2021 | | |

OTHER PUBLICATIONS

CN-103910937-A machine translaiton (Jul. 9, 2014).*

* cited by examiner

*Primary Examiner* — Ana L. Woodward
(74) *Attorney, Agent, or Firm* — Lempia Summerfield Katz LLC

(57) ABSTRACT

A composite resin composition and a molded product for a vehicle interior using the composite resin composition are disclosed. The molded product is manufactured from the composite resin composition at low cost in an eco-friendly manner by removing a painting or fiber wrapping operation. The composite resin effectively improves surface quality of the molded product for a vehicle interior.

16 Claims, 1 Drawing Sheet

COMPOSITE RESIN COMPOSITION AND MOLDED PRODUCT FOR A VEHICLE INTERIOR USING THE SAME

CROSS-REFERENCE TO RELATED APPLICATION

This application claims under 35 U.S.C. § 119(a) the benefit of and priority to Korean Patent Application No. 10-2022-0150405, filed on Nov. 11, 2022, the entire contents of which are incorporated herein by reference.

BACKGROUND

(a) Technical Field

The present disclosure relates to a composite resin composition and a molded product for a vehicle interior fabricated using the same.

(b) Background Art

In general, a molded product for a vehicle interior is fabricated by painting a component or wrapping a component with fiber in order to improve an external appearance of the molded product.

However, painting causes a large portion of fabrication cost of the molded product for a vehicle interior, and such a painted molded product may not be easy to recycle in the scrapping of a vehicle. Thus, painting is not preferable in terms of environment. In addition, paints and bonds may have an adverse effect on indoor air quality (VOCs) of the vehicle. Accordingly, research into a molded product for a vehicle interior having aesthetic surface characteristics while being able to reduce environmental problems and maintaining human body health by removing the need for painting or fiber wrapping is urgently needed.

The above information disclosed in this Background section is provided only to enhance understanding of the background of the disclosure and accordingly, it may include information that does not form prior art that would already be known to a person of ordinary skill in the art.

SUMMARY OF THE DISCLOSURE

The present disclosure has been made in an effort to solve the above-described problem associated with the related art, and an object of the present disclosure is to provide a composite resin composition and a molded product for a vehicle interior using the composite resin composition. In particular, the molded product may be manufactured from the composite resin composition at low cost in an eco-friendly manner by removing a painting or fiber wrapping operation.

Another object of the present disclosure is to provide a composite resin composition and a molded product for a vehicle interior using the same, the composite resin being capable of effectively improving surface quality of a molded product for a vehicle interior.

The object of the present disclosure is not limited to the aforementioned object, and the other objects not specifically mentioned herein may be clearly understood by those with ordinary skill in the art to which the present disclosure pertains (hereinafter 'those skilled in the art') from the following description.

The features of the present disclosure for achieving the object of the present disclosure and performing the characteristic functions of the present disclosure to be described later are as follows below.

In one aspect, the present disclosure provides a composite resin composition including: 35 wt. % to 60 wt. % of a polypropylene resin; 5 wt. % to 12 wt. % of a polyethylene resin; 12 wt. % to 17 wt. % of an olefin-based elastomer; 0.1 wt. % to 1.0 wt. % of metal flakes; 2.0 wt. % to 4.0 wt. % of a pearl pigment; and at least one additional inorganic filler and/or at least one additional additive.

The polypropylene resin may have an isotactic index in a range of 97.5% to 99.5%, a specific gravity in a range of 0.89 to 0.99, and a weight average molecular weight in a range of 200,000 g/mol to 500,000 g/mol.

The polypropylene resin may include: a first polypropylene resin having a melting index (ISO 1133-1, 230° C., 21.2N) in a range of 5 g/10 min to 15 g/10 min, and a second polypropylene resin having a melting index (ISO 1133-1, 230° C., 21.2N) in a range of 25 g/10 min to 35 g/10 min.

The melting index of the first polypropylene resin may be 10 g/10 min, and the melting index of the second polypropylene resin may be 30 g/10 min.

An amount of the second polypropylene resin may range from 35 wt. % to 40 wt. % based on the total weight of the composite resin.

The olefin-based elastomer may include an ethylene-$\alpha$-olefin copolymer. The ethylene-$\alpha$-olefin copolymer may include ethylene-butene rubber, ethylene-hexene rubber, ethylene-octene rubber, or any combination thereof.

The ethylene-$\alpha$-olefin copolymer may include ethylene-octene-rubber. The ethylene-octene rubber may include a first ethylene-octene-rubber having a Mooney viscosity (ASTM D1646) in a range of 1 $ML_{1+4}$ to 10 $ML_{1+4}$, a second ethylene-octene-rubber having a Mooney viscosity (ASTM D1646) in a range of 20 $ML_{1+4}$ to 30 $ML_{1+4}$, or any combination thereof.

The metal flakes may include Al, Cu, Zn, Mg, Ti, Ni, Fe, or any combination thereof.

The average diameter of the metal flakes may range from 30 micrometers ($\mu$m) to 60 $\mu$m.

The pearl pigment may include a mica-based inorganic pigment having a plate structure.

An average diameter of the pearl pigment may range from 150 $\mu$m to 250 $\mu$m.

The inorganic filler may include talc, calcium carbonate, barium sulfate, magnesium oxide, wollastonite, mica, silica, calcium silicate, clay, carbon black, fiberglass, or any combination thereof.

The inorganic filler may have a layered structure of a plate structure.

An amount of the inorganic filler may range from 18 wt. % to 22 wt. % based on the total weight of the composite resin.

The additives may include an antioxidant, an ultraviolet radiation absorber, a nucleating agent, a coupling agent, a dispersing agent, a processing lubricant, a slip agent, an inorganic pigment, or any combination thereof.

An amount of the additives may range from 3 wt. % to 5 wt. % based on the total weight of the composite resin.

According to an aspect of the present disclosure, it is possible to provide a composite resin composition and a molded product for a vehicle interior using the same, wherein the molded product for a vehicle interior may be manufactured from the composite resin composition at low cost in an eco-friendly manner.

According to another aspect of the present disclosure, it is possible to provide a composite resin composition and a molded product for a vehicle interior using the same, the composite resin being capable of effectively improving surface quality of a molded product for a vehicle interior.

The effect of the present disclosure is not limited to the aforementioned effect, and the other effects not mentioned may be clearly recognized by those skilled in the art from the following description.

BRIEF DESCRIPTION OF THE DRAWINGS

The above and other features of the present disclosure are now described in detail with reference to certain exemplary examples thereof illustrated in the accompanying drawings which are given herein below by way of illustration only, and thus are not limitative of the present disclosure, and wherein.

DETAILED DESCRIPTION

Figure 1:
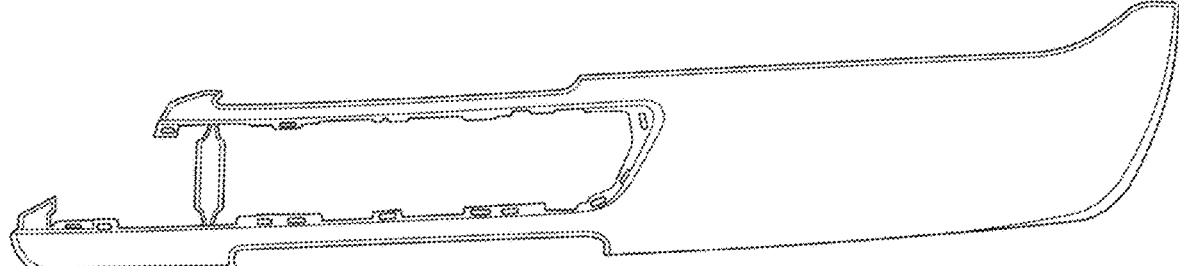
FIG. 1 shows a component for a vehicle interior injection-molded using a composite resin composition according to the present disclosure.

The foregoing and other objects, features, and advantages of the present disclosure are understood from the more particular description of exemplary embodiments of the present disclosure. The present disclosure may, however, be embodied in different forms and should not be construed as being limited to the embodiments set forth herein. Rather, these embodiments are provided so that this disclosure is thorough and complete and fully conveys the present disclosure to those skilled in the art.

Throughout the drawings, like reference numerals are used the drawings to designate like elements. In the accompanying drawings, the dimensions of structures may be exaggerated to clarify the described technology. While terms such as "first" and "second," etc., may be used to describe various components, such components are not limited to the above terms. The above terms are used only to distinguish one component from another. For instance, a first component may be referred to as a second component without departing from the scope of the described technology, and likewise a second component may be referred to as a first component. As used herein, the singular forms "a," "an," and "the" are intended to include the plural forms as well, unless the context clearly indicates otherwise.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added. Also, when an element such as a layer, film, region, or substrate is referred to as being "on" another element, it can be directly on the other element or intervening elements may also be present. Similarly, when an element such as a layer, film, region, or substrate is referred to as being "beneath" another element, it can be directly below the other element or intervening elements may also be present. The term "substantially" as used in this disclosure means completely, almost completely, or to any significant degree.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures among other things. For this reason, in all cases, the term "about" modifies all numbers, figures, and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

Hereinafter, a composite resin composition according to an aspect of the present disclosure is described in detail below.

The composite resin composition according to an aspect of the present disclosure may include (A) 35 wt. % to 60 wt. % of a polypropylene resin, (B) 5 wt. % to 12 wt. % of a polyethylene resin, (C) 12 wt. % to 17 wt. % of an olefin-based elastomer, (D) 0.1 wt. % to 1.0 wt. % of metal flakes, (E) 2.0 wt. % to 4.0 wt. % of a pearl pigment, and (F) at least one inorganic filler, and/or (G) at least one additive, with respect to a total weight of the composite resin composition. Hereinafter, respective components of the composite resin composition according to an aspect of the present disclosure is described in more detail below.

Polypropylene Resin

The composite resin composition may include 35 wt. % to 60 wt. % of a polypropylene resin with respect to the total weight of the composite resin composition. In order to improve the formability of the article and reduce the weight of the article, 35 wt. % or more of the polypropylene resin may be included. For obtaining strength and impact strength, 60 wt. % or less of the polypropylene resin may be included.

The polypropylene resin may be a crystalline polymer including at least one of a propylene homopolymer including a propylene monomer as a main ingredient and an ethylene-propylene copolymer including ethylene. The propylene homopolymer and the propylene-ethylene copolymer may be used alone, or a mixture of the propylene homopolymer and the propylene-ethylene copolymer may be used.

The polypropylene resin has an isotactic index in a range of 97.5% to 99.5%, a specific gravity in a range of 0.89 to 0.99, and a weight average molecular weight in a range of 200,000 g/mol to 500,000 g/mol.

The polypropylene resin may include a first polypropylene resin having a melting index (ISO 1133-1, 230° C., 21.2N) in a range of 5 g/10 min to 15 g/10 min and a second polypropylene resin having a melting index (ISO 1133-1, 230° C., 21.2N) in a range of 25 g/10 min to 35 g/10 min.

Particularly, the melting index (ISO 1133-1, 230° C., 21.2N) of the first polypropylene resin may be 10 g/10 min, and the melting index (ISO 1133-1, 230° C., 21.2N) of the second polypropylene resin may be 30 g/10 min.

The second polypropylene resin may be included in an amount in a range of 35 wt. % to 45 wt. % in the composite resin composition. Particularly, in terms of obtaining formability and productivity, the second polypropylene resin may be included in an amount of 35 wt. % or more. In terms of obtaining mechanical properties, the second polypropylene resin may be included in an amount of 45 wt. % or less.

(B) Polyethylene Resin

The composite resin composition may include 5 wt. % to 12 wt. % of a polyethylene resin with respect to the total weight of the composite resin composition.

The melting index (ISO 1133-1, 230° C., 21.2N) of the polyethylene resin may be in a range of 0.1 g/10 min to 10 g/10 min, but is not limited thereto. A suitable range of a melting index may be selected in consideration of a foaming ratio and mechanical properties.

The weight average molecular weight of the polyethylene resin may range from 400,000 g/mol to 500,000 g/mol.

(C) Olefin-Based Elastomer

The composite resin composition may include an olefin-based elastomer in order to obtain processability, resilience, heat resistance, and impact resistance of the composite resin composition.

The olefin-based elastomer may be included in an amount of 12 wt. % to 17 wt. % with respect to the total weight of the composite resin composition. Particularly, the olefin-based elastomer may be included in an amount of 12 wt. % or more in terms of obtaining impact strength of the molded product. In terms of obtaining strength of the molded product, the olefin-based elastomer may be included in an amount of 17 wt. % or less. In addition, the olefin-based elastomer may have an effect on the shrinkage rate of the molded product. Because this has an effect to the dimensional stability of the molded product, particularly, the olefin-based elastomer may be included in the above-stated range of 12 wt. % to 17 wt. %.

The olefin-based elastomer may be implemented as ethylene-$\alpha$-olefin copolymer. The $\alpha$-olefin used in manufacturing of the ethylene-$\alpha$-olefin copolymer may be $\alpha$-olefin having a carbon number of 4 or more. Specifically, the ethylene-$\alpha$-olefin copolymer, in which the $\alpha$-olefin copolymer has ethylene having a carbon number of 4 or more, may include ethylene-butene-rubber (EBR), ethylene-hexene-rubber (EHR), ethylene-octene-rubber (EOR), or any combination thereof.

When the ethylene-$\alpha$-olefin copolymer is ethylene-octene rubber (EOR), the ethylene-octene-rubber (EOR) may include one or a mixture of a first ethylene-octene-rubber (EOR) having a Mooney viscosity (ASTM D1646) in a range of 1 $ML_{1+4}$ to 10 $ML_{1+4}$ and a second ethylene-octene-rubber (EOR) having a Mooney viscosity (ASTM D1646) in a range of 20 $ML_{1+4}$ to 30 $ML_{1+4}$. When the first ethylene-octene-rubber (EOR) and the second ethylene-octene-rubber (EOR) are used alone or as a mixture, each of the first ethylene-octene-rubber (EOR) alone, the second ethylene-octene-rubber (EOR) alone, or the mixture of the first ethylene-octene-rubber (EOR) and second ethylene-octene-rubber (EOR) may be included in an amount of 12 wt. % to 17 wt. %.

(D) Metal Flake

The composite resin composition may include metal flakes to realize an aesthetic surface appearance of the molded product.

Metal flakes may be implemented as any material capable of realizing the aesthetic surface appearance of the molded product without being specifically limited. As a non-limiting example, the metal flakes may include aluminum (Al), copper (Cu), zinc (Zn), magnesium (Mg), titanium (Ti), nickel (Ni), iron (Fe), or any combination thereof.

Particularly, metal flakes may be included in an amount in a range of 0.1 wt. % to 1.0 wt. % with respect to the total weight of the composite resin composition in order to obtain a luxurious surface appearance and appearance quality of the molded product. Particularly, metal flakes may be included in an amount of 1.0 wt. % or less in order to obtain mechanical properties by preventing degradations in dispersibility and compatibility when extrusion processed and to prevent degradations in appearance quality due to clear flake lines appearing when injection molded.

The size of metal flakes is not specifically limited, but an average diameter of metal flakes may range from 30 μm to 60 μm. The average diameter of metal flakes may be 30 μm or more so that the sense of beauty of metal flakes appears on the surface of the molded product. The average diameter of metal flakes may be 60 μm or less in order to prevent degradations in mechanical characteristics and flake lines from clearly appearing.

(E) Pearl Pigment

The composite resin composition may include a pearl pigment to realize a variety of surface colors of the molded product.

The pearl pigment may be implemented as any material capable of realizing a variety of surface colors of the molded product without being specifically limited. As a non-limiting example, the pearl pigment may be an inorganic pigment having a plate structure based on mica.

The pearl pigment may be included in an amount in a range of 2.0 wt. % to 4.0 wt. % with respect to the total weight of the composite resin composition. In order to obtain a luxurious surface appearance and surface quality of the molded product, the pearl pigment may be included in an amount of 2.0 wt. % or more. In order to prevent degradations in dispersibility when extrusion processed and prevent degradations in mechanical properties and appearance quality caused by gas generation, the pearl pigment may be included in an amount of 4.0 wt. % or less.

The size of the pearl pigment is not specifically limited, but an average diameter of the pearl pigment may be in the range of 150 μm to 250 μm. For a luxurious surface of the molded product, the average diameter of the pearl pigment may be 150 μm or more. In order to prevent degradations in mechanical properties and appearance quality, the average diameter of the pearl pigment may be 250 μm or less.

(F) Inorganic Filler

The composite resin composition may include an inorganic filler to obtain strength, impact resistance, and heat resistance in the molded product.

The inorganic filler may be implemented as any material capable of obtaining mechanical properties of the molded product without being specifically limited. As a non-limiting example, the inorganic filler may include talc, calcium carbonate, barium sulfate, magnesium oxide, wollastonite, mica, silica, calcium silicate, clay, carbon black, fiberglass, or any combination thereof. Further, the inorganic filler may have a layered structure or a plate structure.

The inorganic filler may be included in an amount in a range of 18 wt. % to 22 wt. % with respect to the total weight of the composite resin composition. In terms of obtaining mechanical properties of the molded product, the inorganic filler may be included in an amount of 18 wt. % or more. In consideration of dispersibility when extrusion molded, the inorganic filler may be included in an amount of 22 wt. % or less.

(G) Additive

The composite resin composition may include at least one additive that includes an antioxidant, an ultraviolet (UV) radiation absorber, a nucleating agent, a coupling agent, a dispersing agent, a processing lubricant, a slip agent, an inorganic pigment, or any combination thereof without departing from the objectives and effects of the present disclosure. The amount of the additive may be adjusted within an optimal range of a range required for the composite resin composition, in consideration of the entire amount manufactured and a manufacturing process. As a non-limiting example, the composite resin composition may include 3 wt. % to 5 wt. % of the at least one additive.

The composite resin composition according to an aspect of the present disclosure may be manufactured by mixing the components, including (A) a polypropylene resin, (B) a polyethylene resin, (C) an olefin-based elastomer, (D) metal flakes, (E) a pearl pigment, (F) an inorganic filler, (G) an additive, etc., at the above-described composition ratios using a kneader, such as a single screw extruder, a twin screw extruder, a multi-wheel screw extruder, a Banbari mixer, etc.

Here, the method of manufacturing the composite resin composition according to an aspect of the present disclosure is not limited to the above-described method, and the composite resin composition may be manufactured by mixing the components using a variety of methods other than the above-described method.

The molded product for a vehicle interior according to an aspect of the present disclosure may be manufactured by molding the above-described composite resin composition. For example, a foam molding processing method may be used. For foaming molding, the molded product may be manufactured in an intended shape by applying a variety of methods, such as extrusion molding, compression molding, injection molding, etc.

Figure 2:
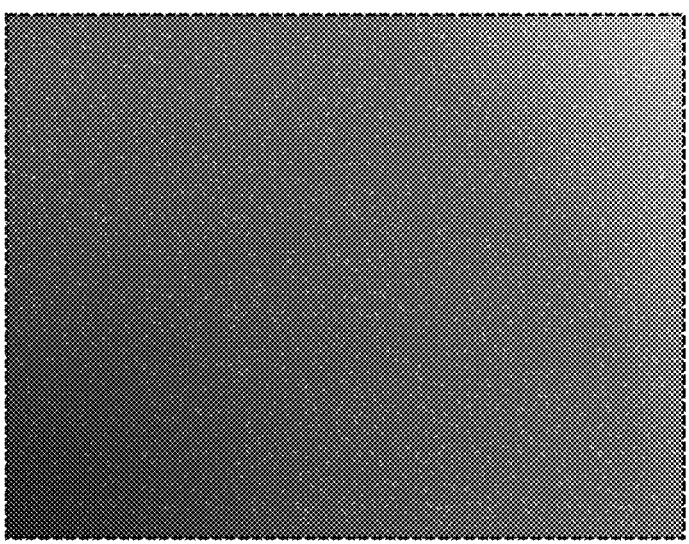
FIGS. 2 and 3 shows enlarged images of the component for a vehicle interior illustrated in FIG. 1.
Figure 3:
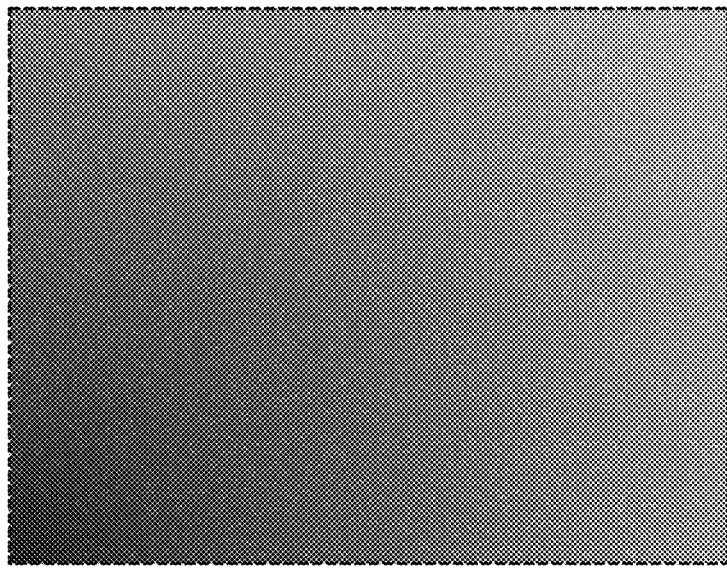

FIG. 1 shows a component for a vehicle interior injection-molded using a composite resin composition according to an aspect of the present disclosure, and FIGS. 2 and 3 are enlarged images captured from the surface of the component for a vehicle interior illustrated in FIG. 1. As illustrated in FIGS. 2 and 3, it can be appreciated that the component for a vehicle interior according to an aspect of the present disclosure has beautiful surface quality.

Hereinafter, physical properties of the present disclosure are described in more detail with reference to Examples and Comparative Examples of the molded products for a vehicle interior manufactured using the above-described composite resin composition. Here, the following Examples are only provided for a better understanding of the present disclosure, and it should be understood that the scope of the present disclosure is not limited to the following Examples.

In the following Experimental Examples, physical properties of respective samples were measured by commonly applying the following method.

Physical Property Evaluation Method

Melt index (MI) was measured according to ISO 1131-1, at a temperature of 230° C., under a stress load of 21.2N.

Specific gravity (g/cm 3) was measured according to ISO 1183-1.

Elongation (%): measured according to ISO 527

Tensile strength (MPa) was measured according to ISO 527, at a speed of 50 mm/min in type A (ISO 3167).

Flexural modulus (MPa) was measured according to ISO 178, at a speed of 2 mm/min.

IZOD impact strength, room temperature (kJ/m 2), was measured according to ISO 180, at a temperature of 23° C.

IZOD impact strength, low temperature (kJ/m 2), was measured according to ISO 180, at a temperature of –10° C.

HDT (° C.) was measured according to ISO 75, at a stress load of 0.45 MPa.

Scratches (ΔL) was measured according to MS210-05, with Ericsson evaluation having been performed according to paragraph 4.9.

Appearance was visually evaluated.

◉: Excellent. This indicates absence of defects, such as scratches, foreign matter, discoloration, a weld line, a flow mark, gas, etc., and a state suitable to be used as a component.

○: Good. This indicates a state requiring minor improvements and suitable to be used as a component.

Δ: Fair. This indicates a state requiring improvements and unsuitable to be used as a component.

X: Poor. This indicates a defective state.

Experimental Example 1

In order to determine a suitable addition amount of metal flakes, (A) a polypropylene resin, (B) a polyethylene resin, (C) an olefin-based elastomer, (D) metal flakes, (E) an inorganic filler, and (F) an additive were prepared as follows:

Polypropylene Resin (A1) First polypropylene resin: High crystallinity polypropylene having a melting index of 10 g/10 min at 230° C. and under a condition of 21.2N according to ISO 1133-1

(A2) Second polypropylene resin: Copolymer polypropylene having a melting index of 30 g/10 min at 230° C. and under a condition of 21.2N according to ISO 1133-1

(B) Polyethylene resin: High density polyethylene having a high density of 0.94 g/cm 3 to 0.96 g/cm 3

(C) Olefin-based elastomer: Ethylene-octene-rubber having a Mooney viscosity of 1 $ML_{1+4}$ to 10 $ML_{1+4}$ according to ISO ASTM D1646

(D) Metal flakes: Metal flakes having an average grain size of 30 μm to 60 μm (E) Inorganic filler: Talc having a plate structure with an average grain size of 3 μm to 12 μm (F) Additive: Antioxidant Table 1 below illustrates ingredient ratios of the composite resin compositions according to Examples 1 to 3 of the present disclosure and Comparative Examples 1 and 2. The composite resin compositions according to the respective Examples and Comparative Examples were respectively manufactured by mixing the following ingredients and then extruded using a twin screw extruder. Extruded pellets were injection-molded using a core-back mold, thereby manufacturing specimens.

TABLE 1

| | Composition (wt. %) | | | | |
| --- | --- | --- | --- | --- | --- |
| | Comp. Ex. 1 | Ex. 1 | Ex. 2 | Ex. 3 | Comp. Ex. 2 |
| A1 | 20 | 19.9 | 19.5 | 19 | 18 |
| A2 | 35 | 35 | 35 | 35 | 35 |
| B | 5 | 5 | 5 | 5 | 5 |
| C | 15 | 15 | 15 | 15 | 15 |
| D | — | 0.1 | 0.5 | 1 | 2 |
| E | 20 | 20 | 20 | 20 | 20 |
| F | 5 | 5 | 5 | 5 | 5 |

Physical properties and surface characteristics of the specimens manufactured according to Examples 1 to 3 and Comparative Examples 1 and 2 were evaluated, and the results thereof are illustrated in Table 2 below.

TABLE 2

| Classification | Comp. Ex. 1 | Ex. 1 | Ex. 2 | Ex. 3 | Comp. Ex. 2 |
|---|---|---|---|---|---|
| MI (230° C., g/10 min) | 22 | 21 | 19 | 17 | 13 |
| Specific Gravity (g/cm$^3$) | 1.04 | 1.04 | 1.04 | 1.05 | 1.06 |
| Elongation (%) | 85 | 76 | 40 | 34 | 22 |
| Tensile Strength (MPa) | 23 | 23.4 | 23.8 | 23.9 | 24.2 |
| Flexural Modulus (MPa) | 1,950 | 1,955 | 1,967 | 1,970 | 1,985 |
| IZOD Impact Strength, Room Temp (kJ/m$^2$) | 16.5 | 16 | 14.9 | 15.2 | 11.9 |
| IZOD Impact Strength, Low Temp (kJ/m$^2$) | 4.5 | 4.3 | 3.5 | 3.3 | 2.7 |
| HDT (° C.) | 104.5 | 104.5 | 104.6 | 104.8 | 105.1 |
| Scratches (ΔL) | 0.99 | 1.01 | 1.09 | 1.15 | 1.32 |
| Appearance (Visual Evaluation) | Δ | ◯ | ◯ | ◯ | ◎ |

As illustrated in Table 2 above, it can be appreciated that Examples 1 to 3 meeting conditions defined by the present disclosure had excellent physical properties and surface characteristics. In contrast, Comparative Example 1 having an insufficient content of metal flakes did not obtain intended surface characteristics, whereas Comparative Example 2 having an excess content of metal flakes did not meet intended impact strength.

Experimental Example 2

In order to determine a suitable addition amount of pearl pigment, (A) a polypropylene resin, (B) polyethylene resin, (C) an olefin-based elastomer, (D) a pearl pigment, (E) an inorganic filler, and (F) an additive were prepared as follows:

Polypropylene Resin (A1) First polypropylene resin: High crystallinity polypropylene having a melting index of 10 g/10 min at 230° C. and under a condition of 21.2N according to ISO 1133-1

(A2) Second polypropylene resin: Copolymer polypropylene having a melting index of 30 g/10 min at 230° C. and under a condition of 21.2N according to ISO 1133-1

B) Polyethylene resin: High density polyethylene having a high density of 0.94 g/cm 3 to 0.96 g/cm 3

(C) Olefin-based elastomer: Ethylene-octene-rubber having a Mooney viscosity of 1 ML$_{1+4}$ to 10 ML$_{1+4}$ according to ISO ASTM D1646

(D) Pearl pigment: Pearl pigment having an average grain size of 150 μm to 250 μm (E) Inorganic filler: Talc having a plate structure with an average grain size of 3 μm to 12 μm (F) Additive: Antioxidant Table 3 below illustrates ingredient ratios of the composite resin compositions according to Example 4 of the present disclosure and Comparative Examples 3 to 6. The composite resin compositions according to the respective Example and Comparative Examples were respectively manufactured by mixing the following ingredients and then extruded using a twin screw extruder. Extruded pellets were injection-molded using a core-back mold, thereby manufacturing specimens.

TABLE 3

| | Composition (wt. %) | | | | |
|---|---|---|---|---|---|
| | Comp. Ex. 3 | Comp. Ex. 4 | Ex. 4 | Comp. Ex. 5 | Comp. Ex. 6 |
| A1 | 20 | 19 | 17 | 15 | 13 |
| A2 | 35 | 35 | 35 | 35 | 35 |
| B | 5 | 5 | 5 | 5 | 5 |
| C | 15 | 15 | 15 | 15 | 15 |
| D | — | 1 | 3 | 5 | 7 |
| E | 20 | 20 | 20 | 20 | 20 |
| F | 5 | 5 | 5 | 5 | 5 |

Physical properties and surface characteristics of the specimens manufactured according to Example 4 and Comparative Examples 3 to 6 above were evaluated, and the results thereof are illustrated in Table 4 below.

TABLE 4

| Classification | Comp. Ex. 3 | Comp. Ex. 4 | Ex. 4 | Comp. Ex. 5 | Comp. Ex. 6 |
|---|---|---|---|---|---|
| MI (230° C., g/10 min) | 23 | 20 | 19 | 15 | 13 |
| Specific Gravity (g/cm$^3$) | 1.04 | 1.04 | 1.05 | 1.07 | 1.09 |
| Elongation (%) | 85 | 76 | 65 | 60 | 54 |
| Tensile Strength (MPa) | 23 | 23.4 | 23.4 | 23.6 | 23.5 |
| Flexural Modulus (MPa) | 1,950 | 1,954 | 1,958 | 1,958 | 1,960 |
| IZOD Impact Strength, Room Temp (kJ/m$^2$) | 16.5 | 15.7 | 14.2 | 12.1 | 11.2 |
| IZOD Impact Strength, Low Temp (kJ/m$^2$) | 4.5 | 4.4 | 3.5 | 3 | 2.6 |
| HDT (° C.) | 104.5 | 104.5 | 104.5 | 104.5 | 104.8 |
| Scratches (ΔL) | 1 | 1.01 | 1.04 | 1.19 | 1.27 |
| Appearance (Visual Evaluation) | Δ | Δ | ◯ | ◯ | ◎ |

As illustrated in Table 4 above, it can be appreciated that Example 4 meeting conditions defined by the present disclosure had excellent physical properties and surface characteristics. In contrast, Comparative Examples 3 and 4 having an insufficient content of the pearl pigment did not obtain intended surface characteristics, whereas Comparative Examples 5 and 6 having an excess content of the pearl pigment did not meet requirements for either a liquidity index or impact strength.

Experimental Example 3

In order to determine a suitable addition amount of olefin-based elastomer, (A) a polypropylene resin, (B) a polyethylene resin, (C) an olefin-based elastomer, (D) metal flakes, (E) a pearl pigment, (F) an inorganic filler, and (G) an additive were prepared as follows.

Polypropylene Resin (A1) First polypropylene resin: High crystallinity polypropylene having a melting index of 10 g/10 min at 230° C. and under a condition of 21.2N according to ISO 1133-1

(A2) Second polypropylene resin: Copolymer polypropylene having a melting index of 30 g/10 min at 230° C. and under a condition of 21.2N according to ISO 1133-1

(B) Polyethylene resin: High density polyethylene having a high density of 0.94 g/cm 3 to 0.96 g/cm 3

(C) Olefin-based elastomer (C1) First ethylene-octene-rubber: Ethylene-octene-rubber having a Mooney viscosity of 20 $ML_{1+4}$ to 30 $ML_{1+4}$ according to ASTM D1646

(C2) Second ethylene-octene-rubber: Ethylene-octene-rubber having a Mooney viscosity of 1 $ML_{1+4}$ to 10 $ML_{1+4}$ according to ASTM D1646

(D) Metal flakes: Metal flakes having an average grain size of 30 μm to 60 μm (E) Pearl pigment: Pearl pigment having an average grain size of 150 μm to 250 μm (F) Inorganic filler: Talc having a plate structure with an average grain size of 3 μm to 12 μm (G) Additive: Antioxidant Table 5 below illustrates ingredient ratios of the composite resin compositions according to Examples 5 to 8 of the present disclosure and Comparative Examples 7 to 11. The composite resin compositions according to the respective Examples and Comparative Examples were respectively manufactured by mixing the following ingredients and then extruded using a twin screw extruder.

TABLE 5

| Composition (wt. %) | Comp. Ex. 7 | Comp. Ex. 8 | Ex. 5 | Comp. Ex. 9 | Ex. 6 | Ex. 7 | Comp. Ex. 10 | Comp. Ex. 11 | Ex. 8 |
|---|---|---|---|---|---|---|---|---|---|
| A1 | 16.5 | 16.5 | 16.5 | 16.5 | 16.5 | 16.5 | 14.5 | 14.5 | 14.5 |
| A2 | 15 | 25 | 35 | 45 | 35 | 35 | 35 | 35 | 35 |
| B | 5 | 5 | 5 | 5 | 5 | 5 | 5 | 5 | 5 |
| C1 | 35 | 25 | 15 | 5 | — | 15 | — | 20 | 7 |
| C2 | — | — | — | — | 15 | — | 20 | — | 10 |
| D | 0.5 | 0.5 | 0.5 | 0.5 | 0.5 | 0.5 | 0.5 | 0.5 | 0.5 |
| E | 3 | 3 | 3 | 3 | 3 | 3 | 3 | 3 | 3 |
| F | 20 | 20 | 20 | 20 | 20 | 20 | 17 | 17 | 20 |
| G | 5 | 5 | 5 | 5 | 5 | 5 | 5 | 5 | 5 |

Physical properties and surface characteristics of the specimens manufactured according to Examples 5 to 8 and Comparative Examples 7 to 11 were evaluated, and the results thereof are illustrated in Table 6 below.

TABLE 6

| Classification | Comp. Ex. 7 | Comp. Ex. 8 | Ex. 5 | Comp. Ex. 9 | Ex. 6 | Ex. 7 | Comp. Ex. 10 | Comp. Ex. 11 | Ex. 8 |
|---|---|---|---|---|---|---|---|---|---|
| MI (230° C., g/10 min) | 10 | 14 | 20 | 27 | 23 | 16 | 23 | 15 | 21 |
| Specific Gravity (g/cm³) | 1.05 | 1.05 | 1.05 | 1.05 | 1.04 | 1.04 | 1.04 | 1.04 | 1.04 |
| Elongation (%) | 252 | 150 | 69 | 58 | 65 | 69 | 72 | 77 | 75 |
| Tensile Strength (MPa) | 15.5 | 18.2 | 23.2 | 27.2 | 25.7 | 25.1 | 24.5 | 24.1 | 24.5 |
| Flexural Modulus (MPa) | 1,080 | 1,580 | 1,952 | 2,310 | 2,275 | 2,210 | 2,050 | 2,015 | 2,025 |
| IZOD Impact Strength, Room Temp (kJ/m²) | NB | 35.0 | 14.8 | 6.8 | 16.2 | 17.4 | 17.9 | 20.9 | 18.8 |
| IZOD Impact Strength, Low Temp (kJ/m²) | 12.2 | 5.9 | 3.8 | 2.6 | 3.7 | 4.1 | 4.2 | 4.8 | 4.6 |
| HDT (° C.) | 95.5 | 99.9 | 104.5 | 108.2 | 107 | 106.5 | 103.1 | 126.9 | 104.1 |
| Scratches (ΔL) | 1.80 | 1.61 | 1.03 | 1.01 | 0.79 | 0.72 | 0.69 | 0.77 | 0.64 |
| Appearance (Visual Evaluation) | Δ | ○ | ◎ | ◎ | ◎ | ◎ | ◎ | ◎ | ◎ |

As illustrated in Table 6 above, it can be appreciated that Examples 5 to 8 meeting conditions defined by the present disclosure had excellent physical properties and surface characteristics. In contrast, each of Comparative Examples 7 to 11 not meeting the content of the olefin-based elastomer did not meet at least one condition of melting index, tensile strength, flexural modulus, impact strength, HDT, scratches, and surface characteristics.

Although the foregoing embodiments have been described with reference to the specific embodiments and the drawings, a variety of modifications and alterations are possible to those skilled in the art to which the present disclosure pertains from the foregoing description. For example, the examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A composite resin composition comprising, based on a total weight of the composite resin:

35 wt. % to 60 wt. % of a polypropylene resin comprising a first polypropylene resin having a melting index (ISO 1133-1, 230° C., 21.2N) in a range of 5 g/10 min to 15 g/10 min and a second polypropylene resin having a melting index (ISO 1133-1, 230° C., 21.2N) in a range of 25 g/10 min to 35 g/10 min;

5 wt. % to 12 wt. % of a polyethylene resin;

12 wt. % to 17 wt. % of an olefin-based elastomer;

0.1 wt. % to 1.0 wt. % of metal flakes;

2.0 wt. % to 4.0 wt. % of a pearl pigment; and an additional inorganic filler and/or an additional additive in addition to the metal flakes and the pearl pigment.

2. The composite resin composition of claim 1, wherein the melting index of the first polypropylene resin is 10 g/10 min, and wherein the melting index of the second polypropylene resin is 30 g/10 min.

3. The composite resin composition of claim 1, wherein an amount of the second polypropylene resin of the polypropylene resin is in a range of 35 wt. % to 40 wt. % based on a total weight of the composite resin.

4. The composite resin composition of claim 1, wherein the olefin-based elastomer comprises an ethylene-α-olefin copolymer, and wherein the ethylene-α-olefin copolymer comprises ethylene-butene rubber, ethylene-hexene rubber, ethylene-octene rubber, or any combination thereof.

5. The composite resin composition of claim 4, wherein the ethylene-α-olefin copolymer comprises ethylene-octene-rubber, and wherein the ethylene-octene rubber comprises a first ethylene-octene-rubber having a Mooney viscosity (ASTM D1646) in a range of 1 $ML_{1+4}$ to 10 $ML_{1+4}$, a second ethylene-octene-rubber having a Mooney viscosity (ASTM D1646) in a range of 20 $ML_{1+4}$ to 30 $ML_{1+4}$, or a combination thereof.

6. The composite resin composition of claim 1, wherein the metal flakes comprise Al, Cu, Zn, Mg, Ti, Ni, Fe, or any combination thereof.

7. The composite resin composition of claim 6, wherein an average diameter of the metal flakes is in a range of 30 μm to 60 μm.

8. The composite resin composition of claim 1, wherein the pearl pigment comprises a mica-based inorganic pigment having a plate structure.

9. The composite resin composition of claim 8, wherein an average diameter of the pearl pigment is in a range of 150 μm to 250 μm.

10. The composite resin composition of claim 1, wherein the additional inorganic filler comprises talc, calcium carbonate, barium sulfate, magnesium oxide, wollastonite, mica, silica, calcium silicate, clay, carbon black, fiberglass, or any combination thereof.

11. The composite resin composition of claim 10, wherein the additional inorganic filler has a layered structure of a plate structure.

12. The composite resin composition of claim 10, wherein an amount of the additional inorganic filler is in a range of 18 wt. % to 22 wt. % based on the total weight of the composite resin.

13. The composite resin composition of claim 1, wherein the additional additive comprises an antioxidant, an ultraviolet radiation absorber, a nucleating agent, a coupling agent, a dispersing agent, a processing lubricant, a slip agent, an inorganic pigment, or any combination thereof.

14. The composite resin composition according to claim 13, wherein an amount of the additional additive is in a range of 3 wt. % to 5 wt. % based on the total weight of the composite resin.

15. A composite resin composition comprising, based on a total weight of the composite resin:

35 wt. % to 60 wt. % of a polypropylene resin, wherein the polypropylene resin comprises: an isotactic index in a range of 97.5% to 99.5%; a specific gravity in a range of 0.89 to 0.99; and a weight average molecular weight in a range of 200,000 g/mol to 500,000 g/mol;

5 wt. % to 12 wt. % of a polyethylene resin;

12 wt. % to 17 wt. % of an olefin-based elastomer;

0.1 wt. % to 1.0 wt. % of metal flakes;

2.0 wt. % to 4.0 wt. % of a pearl pigment; and an additional inorganic filler and/or an additional additive in addition to the metal flakes and the pearl pigment.

16. A molded product for a vehicle interior comprising:

a composite resin composition having, based on a total weight of the composite resin:

35 wt. % to 60 wt. % of a polypropylene resin, wherein the polypropylene resin comprises: a first polypropylene resin having a melting index (ISO 1133-1, 230° C., 21.2N) in a range of 5 g/10 min to 15 g/10 min; and a second polypropylene resin having a melting index (ISO 1133-1, 230° C., 21.2N) in a range of 25 g/10 min to 35 g/10 min;

5 wt. % to 12 wt. % of a polyethylene resin;

12 wt. % to 17 wt. % of an olefin-based elastomer;

0.1 wt. % to 1.0 wt. % of metal flakes;

2.0 wt. % to 4.0 wt. % of a pearl pigment; and an additional inorganic filler and/or an additional additive in addition to the metal flakes and the pearl pigment.

* * * * *